(12) United States Patent
Lunt et al.

(10) Patent No.: US 7,797,725 B2
(45) Date of Patent: Sep. 14, 2010

(54) SYSTEMS AND METHODS FOR PROTECTING PRIVACY

(75) Inventors: Teresa F Lunt, Palo Alto, CA (US); Daniel H Greene, Sunnyvale, CA (US); Philippe J Golle, San Francisco, CA (US); Richard H Bruce, Los Altos, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 1444 days.

(21) Appl. No.: 11/003,688

(22) Filed: Dec. 2, 2004

(65) Prior Publication Data
US 2006/0123461 A1 Jun. 8, 2006

(51) Int. Cl.
*G06F 17/00* (2006.01)
(52) U.S. Cl. .......................... 726/1; 707/602; 707/776
(58) Field of Classification Search ..................... 726/1; 707/602, 776
See application file for complete search history.

(56) References Cited

U.S. PATENT DOCUMENTS

| 6,327,574 | B1 * | 12/2001 | Kramer et al. ........... 705/14.66 |
| 7,234,065 | B2 * | 6/2007 | Breslin et al. ............... 713/193 |
| 7,353,532 | B2 * | 4/2008 | Duri et al. ...................... 726/1 |
| 2003/0154404 | A1 * | 8/2003 | Beadles et al. .............. 713/201 |
| 2004/0111639 | A1 * | 6/2004 | Schwartz et al. ............ 713/201 |
| 2005/0131757 | A1 * | 6/2005 | Chan et al. ..................... 705/14 |
| 2005/0251865 | A1 * | 11/2005 | Mont et al. .................... 726/26 |

OTHER PUBLICATIONS

Related U.S. Appl. No. 11/004,748, Teresa F. Lunt et al.
Latanya Sweeney, "k-Anonymity: A Model for Protecting Privacy", International Journal on Uncertainty, Fuzziness and Knowledge-based Systems, 10 (5), 2002; 557-570.
Jessica Staddon, "Dynamic Inference Control", DMKD03: 8th International Workshop on Research Issues in Data Mining and Knowledge Discovery, 2003.
Latanya Sweeney, "Finding Lists of People on the Web", ACM Computers and Society, 34(1) Apr. 2004.
R. Lukose, E. Adar, J. Tyler,"SHOCK: Communicating with Computational Messages and Automatic Private Profiles", WWW 2003, May 2003, Budapest, Hungary, ACM.
E. Adar, C. Sengupta, J. Tyler, N. Good, "Shock: Aggregating Information While Preserving Privacy" Information Systems Frontiers 5:1, 15-28, 2003, Kluwer Academic Publishers.
Shanti Shankarkumar, "Rakesh Mathur's Karma Yoga", Mar. 3, 2000,downloaded from URL: http://www.rediff.com/us/2000/mar/03us1.htm.
Latanya Sweeney, "Navigating Computer Science Research Through Waves of Privacy Concerns", Carnegie Mellon University, School of Computer Science, Tech Report, CMU 03-165, CMU-ISRI-03-102, Pittsburgh, Jul. 2003.
M. Freedman, K. Nissim, B. Pinkas, "Efficient Private Matching and Set Intersection", Advances in Cryptology—Eurocrypt '2004 Proceedings LNCS 3027, Springer Verlag, pp. 1-19 May 2004.
Pierangela Samarati, Latanya Sweeney, "Protecting Privacy When Disclosing Information: k-Anonymity and Its Enforcement Through Generalization and Suppression", Proceedings of the IEEE Symposium on Research in Security and Privacy, May 1998, Oakland, CA.

* cited by examiner

*Primary Examiner*—Kambiz Zand
*Assistant Examiner*—Amare Tabor
(74) *Attorney, Agent, or Firm*—Park, Vaughan & Fleming LLP

(57) ABSTRACT

Techniques for providing privacy protection are provided. A query is received. Privacy policy information, extracted knowledge and optional information about available public information are determined. Information about the knowledge extraction transformations applied to create the extracted knowledge and the source data is determined. Privacy protecting transformations are determined and applied to transform the extracted knowledge based on the selected privacy policy, optional information about available public information, the characteristics of the applied knowledge extractions transformations, the source data and optional previous user queries.

47 Claims, 10 Drawing Sheets

| CITY OF OPERATION | AVERAGE EARNINGS (MILLIONS) |
|---|---|
| A | 325 |
| B | 600 |

FIG. 8

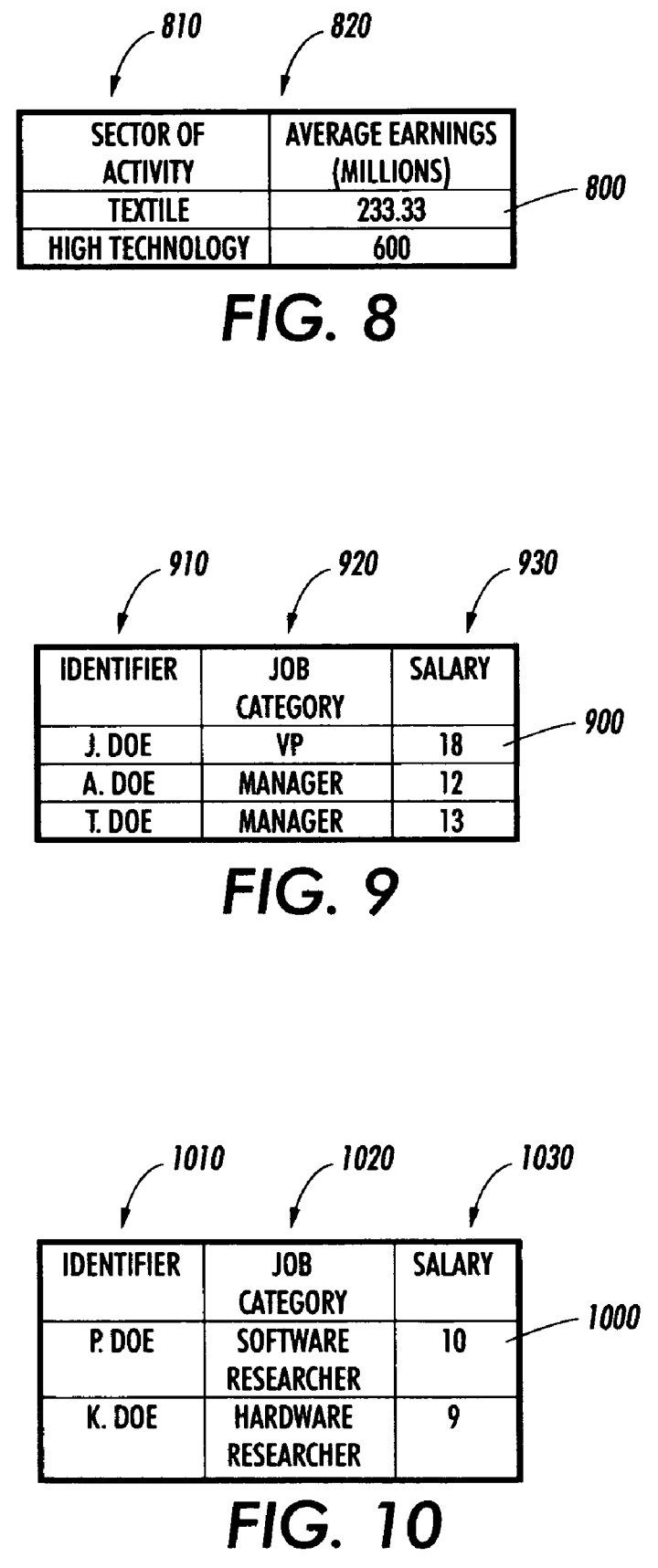

| SECTOR OF ACTIVITY | AVERAGE EARNINGS (MILLIONS) |
|---|---|
| TEXTILE | 233.33 |
| HIGH TECHNOLOGY | 600 |

FIG. 9

| IDENTIFIER | JOB CATEGORY | SALARY |
|---|---|---|
| J. DOE | VP | 18 |
| A. DOE | MANAGER | 12 |
| T. DOE | MANAGER | 13 |

FIG. 10

| IDENTIFIER | JOB CATEGORY | SALARY |
|---|---|---|
| P. DOE | SOFTWARE RESEARCHER | 10 |
| K. DOE | HARDWARE RESEARCHER | 9 |

| JOB CATEGORY | AVERAGE SALARY | COUNT | SENIOR_ MANAGEMENT_ DERIVED |
|---|---|---|---|
| VP | 18 | 1 | YES |
| MANAGER | 12.5 | 2 | YES |
| RESEARCHER | 9.5 | 2 | NO |

FIG. 11

```
PRIVACY POLICY
IF((SENIOR_MANAGEMENT_DERIVED=='NO') &&
(COUNT>1)){DISPLAY $RECORD};
ELSE{
   IF((SENIOR_MANAGEMENT_DERIVED=="YES") &&
(COUNT>3)){DISPLAY $RECORD};
   ELSE{WITHHOLD $RECORD};}
```

FIG. 12

| JOB CATEGORY | AVERAGE SALARY |
|---|---|
| VP | - |
| MANAGER | - |
| RESEARCHER | 9.5 |

FIG. 13

| IDENTIFIER | COUPON USAGE | GENERIC USAGE | FREQUENCY |
|---|---|---|---|
| J. DOE | YES | 0.1 | RARE |
| T. DOE | YES | 0.1 | RARE |
| . | . | . | . |
| . | . | . | . |
| . | . | . | . |
| A. DOE | NO | .8 | FREQUENT |

*FIG. 14*

```
PRIVACY POLICY
IF((COUNT = > 2)){DISPLAY $RECORD};
ELSE{WITHHOLD $RECORD};
```

*FIG. 15*

| IDENTIFIER | AMOUNT | DATE | PRODUCT |
|---|---|---|---|
| T. DOE | $50.00 | 1/1/2004 | DRUG A |
| T. DOE | $50.00 | 3/1/2004 | DRUG A |
| T. DOE | $50.00 | 6/1/2004 | DRUG A |
| . | . | . | . |
| . | . | . | . |
| . | . | . | . |
| A. DOE | $12.00 | 2/10/2004 | DRUG B |

```
PRIVACY POLICY
SWITCH(CUSTOMER.USGAE){
  CASE HEALTH_CARE_MANAGEMENT:
    DISPLAY $RECORD;
    BREAK;
  CASE MARKETING:
    TRANSFORM.REMOVE($RECORD, DATE);
    TRANSFORM.REMOVE($RECORD, PRODUCT);
    TRANSFORM.ROUND_OFF($RECORD, AMOUNT)
    BREAK;
  DEFAULT:
    WITHHOLD $RECORD;
    BREAK;
}
```

FIG. 18

| IDENTIFIER | DATE | LOCATION | AMOUNT |
|---|---|---|---|
| T. DOE | 1/1/2004 | SAN FRANCISCO CA USA | USD $14.00 |
| T. DOE | 1/7/2004 | SAN FRANCISCO CA USA | USD $12.00 |
| T. DOE | 1/14/2004 | VANCOUVER BC CANADA | USD $16.00 |
| T. DOE | 2/3/2004 | LAKE TAHOE CA USA | USD $20.00 |
| . | . | . | . |
| . | . | . | . |
| . | . | . | . |
| A. DOE | 1/28/2004 | RESTON VA USA | USD $11.00 |

FIG. 19

```
PRIVACY POLICY
IF(CUSTOMER.REQUIRED.FIELDS=="IDENTIFIER"){
  DISPLAY(TRANSFORM.CLUSTERING($RECORD,
LOCATION));
  }
ELSE{
  DISPLAY(TRANSFORM.REMOVE($RECORD,
$RECORD.FIELD."NAME_IDENTIFIER"));
  }
```

SYSTEMS AND METHODS FOR PROTECTING PRIVACY

INCORPORATION BY REFERENCE

This Application is related to:

entitled "SYSTEMS AND METHODS FOR PROTECTING PRIVATE INFORMATION IN A MOBILE ENVIRONMENT" by Teresa Lunt et al., filed 2 Dec. 2004, as U.S. patent application Ser. No. 11/004,748; herein incorporated by reference in its entirety.

BACKGROUND OF THE INVENTION

1. Field of Invention

This invention relates to protecting privacy.

2. Description of Related Art

Conventional systems for protecting privacy determine quasi-identifiers in data sets useful in re-identifying individuals. These systems attempt to generalize, hide and/or withhold the quasi-identifying information to protect the privacy of subjects. Thus, in one conventional system for protecting privacy, salary information for a specific user is hidden within the aggregate salary of a group of subjects. Some conventional systems attempt to generalize information to prevent re-identification. Thus, the digits of a subject's unique identification number are transformed by replacing digits with wildcards. This generalization transform creates larger subject groupings which tend to lessen the impact of an information disclosure.

In "Protecting Privacy when Disclosing Information: k-Anonymity and Its Enforcement through Generalization and Suppression", Technical Report, SRI International, March 1998, P. Samarati et al. describe a privacy system based on a theory of k-anonymity. Samarati et al. propose granular access to any sensitive information by applying the minimal set of generalization transformations necessary to create desired groups of size "k". In this conventional privacy system, the subject identifying information is transformed by generalization transformations. Although useful, these conventional systems for protecting privacy have limited application in data mining applications since they rely on access to the underlying records of the data source. Due to privacy restrictions, third party access to the records of the underlying data source is generally restricted.

Modern data mining and data warehousing systems use complex algorithms to identify interesting patterns of information in the records of the underlying data source. The patterns of information frequently relate to groups of subjects. Knowledge about these interesting groups of subjects may be extracted or mined using agglomerative clustering; k-means clustering and/or various other knowledge extraction transformations. However, if the extracted knowledge is combined with information already available to the public, the combined information can in some instances be used to re-identify specific subjects within the groups.

Conventional k-anonymity and/or data generalization-based privacy systems are applied to the underlying records of the information source before the knowledge extraction and/or data mining transformations are performed. These conventional systems for protecting privacy are difficult to implement in a multi-party environment where only the clustered, agglomerated or extracted knowledge is available for sharing with a vendor. Moreover, these conventional systems for protecting privacy assume that all the relevant information is available simultaneously in a single location.

In practice however, information about subjects is likely to be dispersed among a number of data sources and only the extracted knowledge or data is sold or transferred. Thus, if the extracted knowledge or data is not properly protected or anonymized, third parties may combine the extracted knowledge with other information sources to re-identify subjects and compromise the subject's privacy.

Thus, systems and methods for protecting privacy of entities associated with the extracted knowledge or data are required.

SUMMARY OF THE INVENTION

The systems and methods according to this invention provide for anonymizing knowledge or data extracted using a knowledge extraction and/or data mining transformation, to protect the privacy of individuals and/or entities associated with the extracted knowledge and/or mined data. The systems and methods according to this invention determine a request for information; a privacy policy; sources of information and optional information about the public information concerning a subject and prior query history. Knowledge is extracted using data mining and/or other transformations, either dynamically in response to a query or in a prior operation. The extracted knowledge is associated with the characteristic information about the applied knowledge extraction transformations and the characteristics information about the data set from which the knowledge was extracted. The privacy protecting transformations are based on information about the characteristics of the applied knowledge extraction methods, the characteristics of the data from which the knowledge was extracted, the determined privacy policy, previous user queries and/or the optional information about the public information concerning a subject.

BRIEF DESCRIPTION OF THE DRAWINGS

FIG. 8 is a second exemplary data structure for storing extracted knowledge according to this invention;

FIG. 9 is a second exemplary data structure for storing data to be mined according to this invention;

FIG. 10 is a third exemplary data structure for storing data to be mined according to this invention;

FIG. 11 is a third exemplary data structure for storing extracted knowledge according to this invention;

FIG. 12 shows a first privacy policy stored within an exemplary data structure for storing a privacy policy according to this invention;

FIG. 13 is a fourth exemplary data structure for storing extracted knowledge according to this invention;

FIG. 14 is a fifth exemplary data structure for storing extracted knowledge according to this invention;

FIG. 15 shows a second privacy policy stored within an exemplary data structure for storing a privacy policy according to this invention;

FIG. 16 shows a fourth exemplary data structure for storing data to be mined according to this invention;

FIG. 17 shows a third exemplary privacy policy stored within an exemplary data structure for storing a privacy policy according to this invention;

FIG. 18 is a fifth exemplary data structure for storing data to be mined according to this invention; and FIG. 19 shows a fourth privacy policy stored within an exemplary data structure for storing a privacy policy according to this invention.

DETAILED DESCRIPTION OF EXEMPLARY EMBODIMENTS

Figure 1:
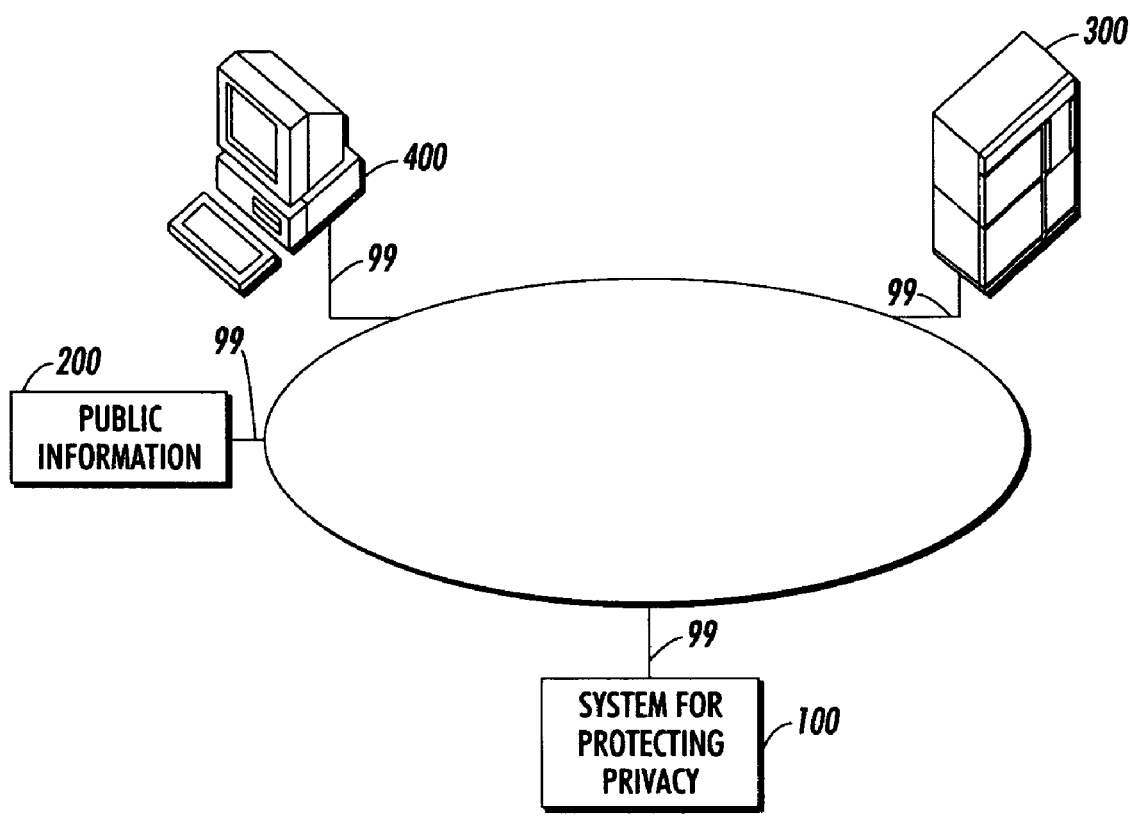
FIG. 1 is an overview of an exemplary system for protecting privacy according to this invention.

FIG. 1 is an overview of an exemplary system for protecting privacy 100 according to this invention. The system for protecting privacy 100 is connected via communications links 99 to a personal computer 400; a repository of public information concerning subjects 200 and an extracted knowledge repository 300.

A user of the personal computer 400 submits a query requesting the average salary of employees of a corporation X. The query is submitted to an extracted knowledge repository 300 containing knowledge extracted from corporate information. The query is mediated by the system for protecting privacy 100. The privacy policies of the corporation and the users affected by the disclosure of information are retrieved by the system for protecting privacy 100. The system for protecting privacy 100 also retrieves the characteristics of the knowledge extraction transforms that were applied to the corporate information as well as the characteristics of the corporate information data set from which the knowledge was extracted. The characteristics of the applied knowledge extraction transforms and the characteristics of the data set are used to determine any additional transformations necessary to properly protect the private information represented by the extracted knowledge without requiring actual access to the underlying data set that was mined. The privacy protected extracted knowledge or data is then returned to the user of personal computer 400 via the communications links 99.

The use of the system for protecting privacy 100 allows knowledge extracted from private information to be safely released without compromising the privacy of the subjects. By releasing less information, the potential value of the information is substantially increased since subjects are more likely to share information when their privacy preferences are met. In various exemplary embodiments according to this invention, a system for protecting privacy 100 is used to reduce the risk of privacy violations.

For example, in one of the exemplary embodiments, a system for protecting privacy 100 is interposed between members of a trade group. The system for protecting privacy blocks the identification of individual elements in the aggregate trade group statistics. In this way, the trade group information is dynamically shared with trade group members while ensuring compliance with regulations concerning antitrust and/or anti-competitive behavior.

The system for protecting privacy 100 can also be used to analyze the influence of various lifestyle factors in clinical drug trials, medical procedures and other experiments without compromising the privacy of subjects. Thus, the lifestyle of a subject, genetic information and/or other private information likely to affect the drug trial can be introduced into models of drug and/or medical procedure efficacy while preserving the privacy of the subject. It will be apparent that these examples are illustrative and not intended to be limiting. Thus, the system for protecting privacy 100 can be used to measure various behaviors and outcomes related to a subject's private information.

Figure 2:
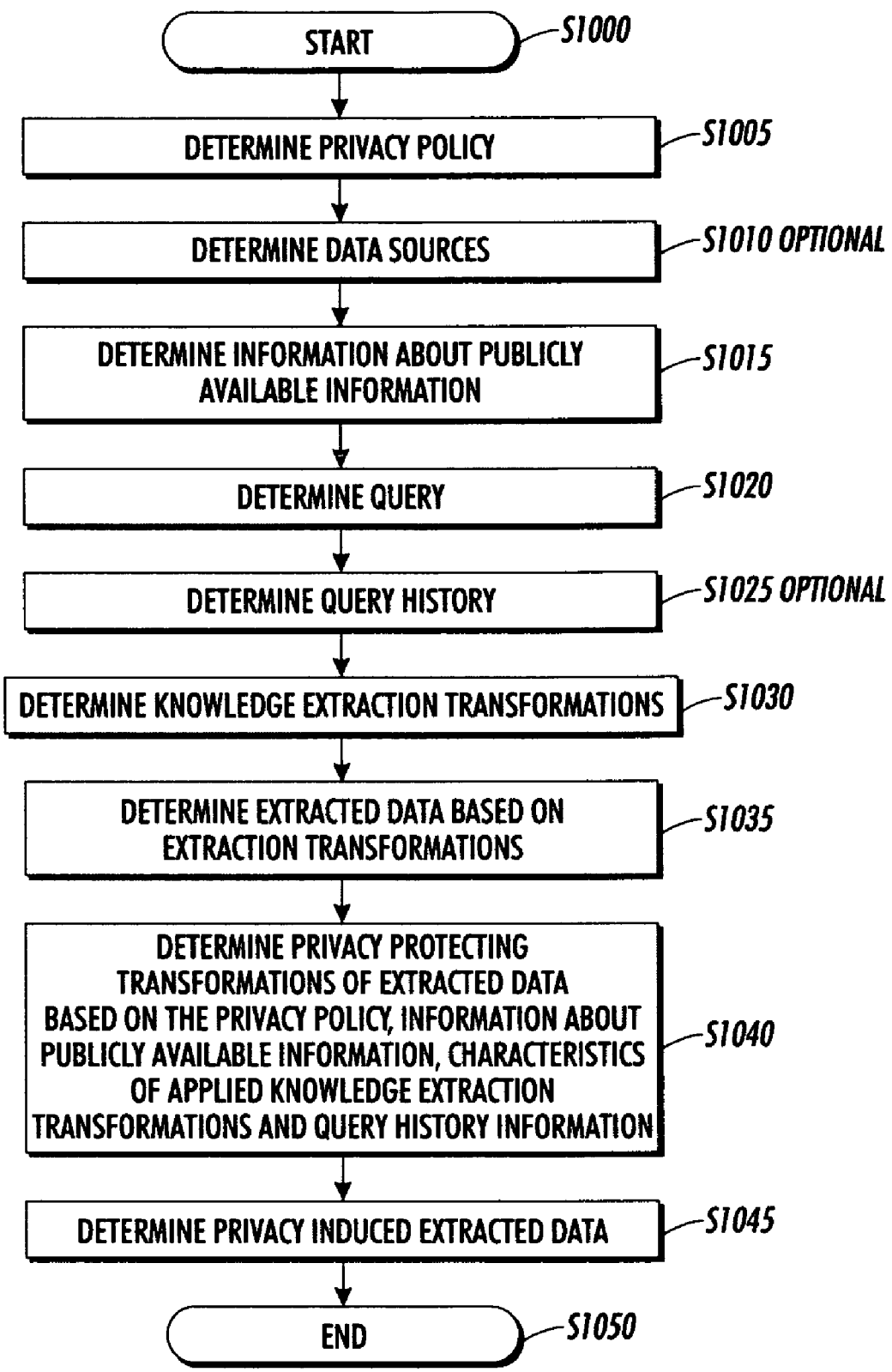
FIG. 2 is a first exemplary method of protecting privacy according to this invention.

FIG. 2 is a first exemplary method of protecting privacy according to this invention. The process begins at step S1000 and immediately continues to step S1005.

In step S1005, a required privacy policy is determined. A privacy policy is defined for the purposes of this application, as any expression of a subject's privacy preferences with respect to the disclosure of information about the subject. The privacy policy may be a single privacy policy or a combined privacy policy. A single privacy policy may be associated with a specific subject, a specific customer or any known or later identified organizational unit or entity. A combined privacy policy is a privacy policy formed by combining one or more single privacy policies together. For example, a combined privacy policy may be formed from the privacy policy of each subject referenced in a customer query, the privacy policies associated with national and regional laws and/or any other privacy policy grouping likely to affect the customer's query. In various exemplary embodiments according to this invention, the privacy policy is encoded using the Enterprise Privacy Authorization Language (EPAL), the P3P Preference Exchange Language 1.0 (APPEL1.0) or any known or later developed method for expressing privacy preferences. It will be apparent that these examples are illustrative and not limiting.

The privacy policy may be described in terms of k-anonymity, the minimum number of subjects required in the most specific category, the impact or effect a disclosure may have, how much work it would be to re-identify an individual and the like. Single or multiple privacy policies may be created to govern financial, medical and/or various other types of information. Moreover, two or more privacy policies are combinable into a combined privacy policy reflecting the constraints imposed by each respective privacy policy without departing from the scope of this invention.

For example, a subject in a clinical drug trial may create and/or select a privacy policy permitting the sharing of medical and lifestyle information with a group of customers. The customer group may include the subject's medical practitioners, the organizers of a clinical trial in which the subject participates, the manufacturer of the drug used in the clinical trial, the Food and Drug Administration and/or various other entities. Moreover, a subject may be an individual person, a legal entity such as a corporation or any known or later developed organizational entity. It will be apparent that a variety of characteristics such as hair color, eye color, blood type, allergies, ethnicity and/or any known or later developed feature concerning a subject, may be associated with, and protected by privacy policies within the scope of this invention. These examples are intended to be illustrative and not limiting. After the required privacy policy has been determined, control continues to step S1010.

In step S1010, data sources are optionally determined. The data sources may include but are not limited to ubiquitous computing and sensor data, location based data, transaction data, including credit card, credit history, club cards, vendor information financial information, health information or any known or later developed source of information about a subject. After the data sources are optionally determined, control continues to step S1015.

The information about the public information concerning subjects is optionally determined in step S1015. Public information is information about a subject that has already been released, is widely known and/or is easily obtained. In various exemplary embodiments according to this invention, the public information may be optionally purchased from a public information repository, or may be made available without charge.

For example, professional licensing information about a subject may be disclosed in a publicly accessible record as a matter of law. In some cases, this publicly available professional licensing information is available from a website such as a Medical Quality Review Board or the like. Non-public information includes voter registration information that is a matter of public record but which may only be used for certain purposes and/or in certain jurisdictions. This and other information that cannot be disseminated due to force of law, corporate policy, societal norms or other criteria is not publicly available information. Thus, public information may be change based on the location, residence of subjects, customers and/or third parties service providers and the like.

In contrast, information that has already been released, is widely known and is easily obtained is publicly available information. The determination of what information is publicly available serves as a standard against which information disclosures can be measured. Thus, information that is already publicly available can generally be disclosed without unduly affecting a subject's privacy. After the public information concerning the subject has been optionally determined, control continues to step S1020.

In step S1020, the query is determined. The query is determined by the customer who is presented with a description and/or summary of information/knowledge available for query and/or sale. For example, in one exemplary embodiment according to this invention, a list of features about one or more subjects is presented to the customer. A customer query may then be used to request the subject's hair color, size, weight and/or various other features about the subjects. After the query is determined, control continues to step S1025.

The query history is optionally determined in step S1025. In various exemplary embodiments according to this invention, the query history is determined based on a customer's past queries. However, in still other exemplary embodiments, groupings are based on internet protocol (IP) address information, legal identity and/or other criteria useful in identifying the same and/or similarly situated customers. After the query history constraints are determined, control continues to step S1030.

In step S1030, the optional knowledge extraction transformations are determined. In one exemplary embodiment according to this invention, the knowledge extraction transformations are used to infer the subject's interest in kayaking and/or skiing based on credit card purchase transactions of ski and kayak equipment, purchase of lift tickets at Squaw Valley and the like. In various other embodiments, medical information such as the purchase of splints, crutches and pain medication, in Salt Lake City Utah may be used to infer the subject's recreational activities. More specific subject reported and/or medical practitioner reported information may also be used to infer additional information about a subject. It should be apparent however that these examples are not intended to be limiting and that various knowledge extraction transforms may be used without departing from the scope of this invention. After the knowledge extraction transformations have been determined, control continues to step S1035.

In step S1035, the extracted knowledge or data is determined based on the knowledge extraction transforms. After the extracted knowledge or data has been determined, control continues to step S1040.

The privacy protecting transformations of the extracted data are determined in step S1040. The privacy protecting transformations are based on the characteristics of the applied knowledge extraction transformations, the characteristics of the data over which the knowledge extraction processes are applied, the privacy policy and optionally, the public information concerning the subjects. The privacy protecting transformations ensure that the determined privacy policy is enforced.

For example, an exemplary privacy policy may specify that individual subject's identities are not to be revealed, that identity is not easily inferred (for example, by making sure that an individual subject's data is merged or aggregated with a minimum number of like subjects' data) and that information that is released cannot be linked to individual subjects either by matching with publicly available information or by combining with previous query results, unless permitted by the privacy policy. Thus, although a black or brown hair color value may not identify an individual subject, a green hair color value may. It will be apparent that the publicly available information may be determined before, after and/or simultaneously with a query without departing from the scope of this invention. In various embodiments of this invention, categories or groupings that make identification of individual subjects more likely are transformed to make the categories less informative or may be merged and/or omitted. After the privacy protecting transformations are determined, control continues to step S1045.

In step S1045, the privacy protected extracted knowledge or data is determined based on the privacy protecting transformations. The privacy protected extracted knowledge or data is then made available to the customer. Control immediately continues to step S1050 and the process ends.

Figure 3:
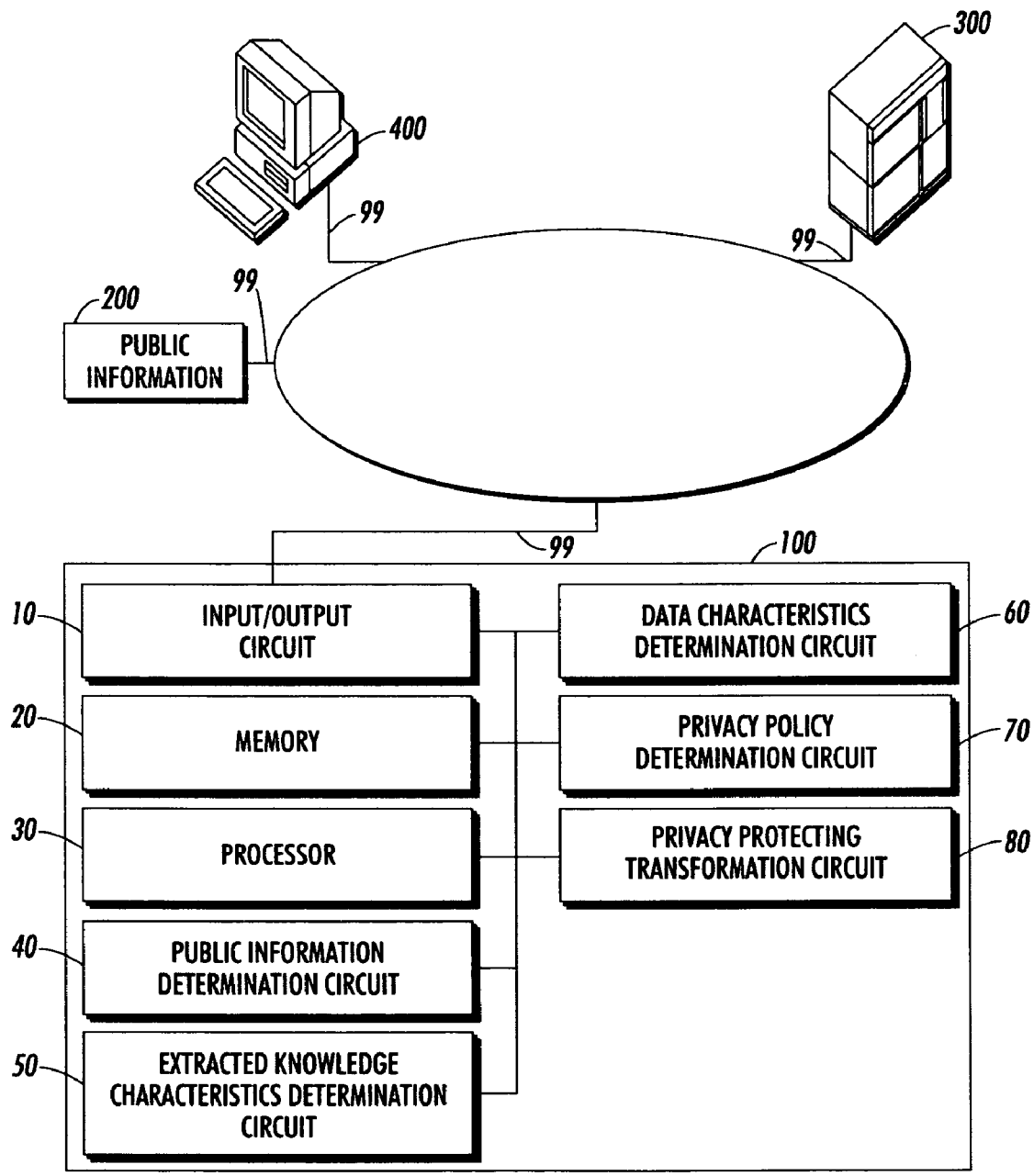
FIG. 3 is an exemplary system for protecting privacy according to this invention.

FIG. 3 is an exemplary system for protecting privacy 100 according to this invention. The system for protecting privacy 100 is comprised of a memory 20; a processor 30; a public information determination circuit 40; an extracted knowledge characteristics determination circuit 50; a data characteristics determination circuit 60; a privacy policy determination circuit 70; and a privacy protecting transformation circuit 80, each connected to input/output circuit 10 and via communications links 99 to an extracted knowledge repository 300; a personal computer 400 and an optional public information repository 200.

In a first exemplary embodiment according to this invention, a user of the personal computer 400 initiates a request for the average salary of employees in company A contained in the extracted knowledge repository 300. The requested information may include average salary information for an employee of company A. However, it will be apparent that in various other embodiments, the requested information may include, but is not limited to average salaries of a governmental department, average salaries for a specific position reported across all companies in an industry trade group, and/or any other type of private information.

The request is forwarded to the input/output circuit 10 of the system for protecting privacy 100. The system for protecting privacy 100 mediates access to the extracted knowledge repository 300. The processor 30 activates the extracted knowledge characteristics determination circuit 50 to determine the characteristics of the transforms used to extract knowledge. In one of the various exemplary embodiments according to this invention, the extracted knowledge characteristics determination circuit 50 retrieves the characteristics of the extracted knowledge transforms from the extracted knowledge or data repository 300. That is, the extracted knowledge is associated with information about the type of knowledge extraction transforms used to create the extracted knowledge. The characteristics of the extracted knowledge transforms are then encoded into extensible markup language (XML) tags stored within the extracted knowledge file, associated with a table in a relational database, and/or encoded using any known or later developed method that associates the characteristics of the extracted knowledge transforms with the extracted knowledge and/or data.

The processor then activates the data characteristics determination circuit 60. The data characteristics determination circuit 60 determines characteristics of the data set from which the knowledge was extracted. The data characteristics may include but are not limited to indications of whether the data has been aggregated in previous steps, the sensitivity of the data or any characteristic useful in protecting the privacy of subjects associated with the information. The data characteristics are optionally encoded using extensible markup language (XML) tags stored within the extracted knowledge information, associated with relational databases and/or encoded using any known or later developed method of associating the data characteristics information with the extracted knowledge or data.

The processor 30 then optionally activates the public information determination circuit 40. The public information determination circuit 40 determines what information has already been revealed to the public. In various exemplary embodiments according to this invention, the public information determination circuit 40 dynamically queries the optional public information repository 200 to determine the public information currently known about a subject.

In various exemplary embodiments according to this invention, the public information determination circuit 40 is loaded with public information. The public information may be downloaded from a secure source of public information, or determined using any other known or later developed method. The processor 30 then activates the privacy policy determination circuit 70. The privacy policy determination circuit 70 retrieves one or more relevant privacy policies. The relevant privacy policies are associated with the subject, the jurisdiction, the customer or any other known or later developed feature relevant to determining one or more relevant privacy policies. In various exemplary embodiments according to this invention, the relevant privacy policies are retrieved from a central repository such as a lightweight directory access protocol (LDAP) server, a directory server, a database or any other known or later developed information source.

Information about subjects in the extracted knowledge is associated with privacy policies. The privacy policies govern the entities to whom the information can be released, the length of time the information can be retained, permissible uses of the information and the like. Additional relevant privacy policies may be imposed by various parties. For example, a government licensing agency accumulates information about a medical professional for licensing purposes. The government agency may specify a privacy policy that allows sharing the information with hospitals and insurance providers but which prohibits transfer of the licensing information to third parties. In various other exemplary uses, a privacy policy created by a corporation is applied to prohibit the disclosure of any information not specifically required by law or regulation. It will be apparent that one or more privacy policies may be applied in combination with the extracted knowledge to determine the type of privacy protecting transformations required. Thus, a subjects' privacy policy may be combined with a health provider's privacy policy. The combined subject-health-provider privacy policy is in turn combined with an insurance company's privacy policy to provide a combined subject-health-provider-insurer privacy policy. It will be apparent that the privacy policies of relevant groups such as subjects, third party processors, aggregators, juridical entities and the like are all combinable within a combined privacy policy according to various embodiments of this invention.

The processor 30 then activates the privacy protecting transformation circuit 80. The privacy protecting transformation circuit 80 uses the determined privacy policy, the characteristics of the extracted knowledge, the characteristics of the data from which the knowledge was extracted, an optional previous user history and the optional public information concerning a subject to determine the privacy protecting transformations required to comply with the determined privacy policy.

The privacy protecting transformation circuit 80 includes characteristic information about how the different knowledge extraction transformations, the characteristics of the underlying data and the public information concerning one or more subjects, interact to disclose identifying and/or sensitive information. In various exemplary embodiments according to this invention, the privacy protection transformation circuit 80 receives information about the characteristics of the knowledge extraction transformations and the characteristics of the data set from a central repository. However, in still other exemplary embodiments, the characteristics of the knowledge extraction transformations and the characteristics of the data set are encoded directly within the circuit, learned through machine learning or determined using any known or later developed method.

The processor 30 applies the determined privacy protecting transformations required to achieve the specified privacy policy. The privacy protected extracted knowledge is then returned over the communications links 99 to the user of personal computer 400. It will be apparent that the system for protecting privacy 100 may be included directly within the extracted knowledge repository 300 or at any other location accessible over communications links 99.

Figure 4:
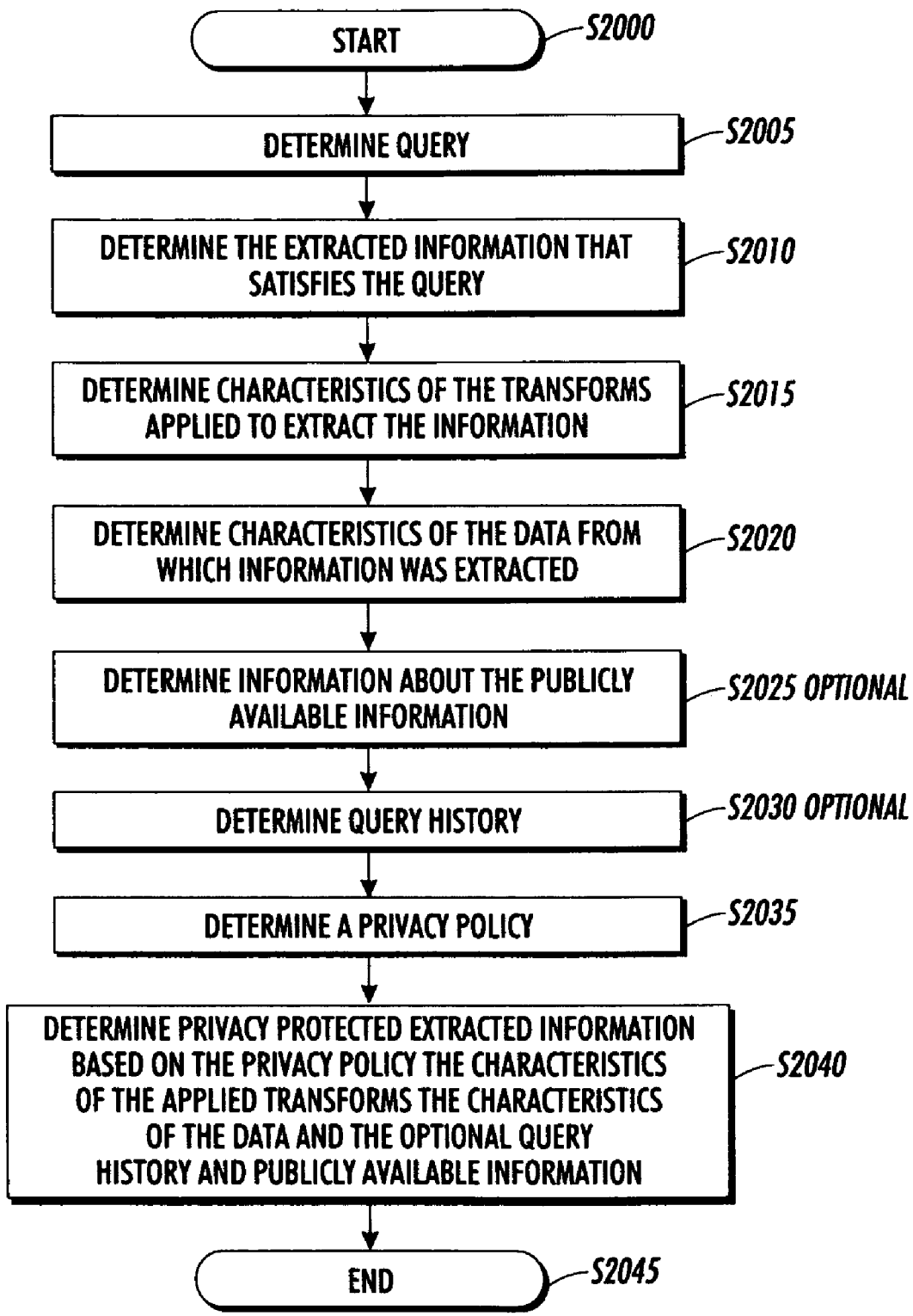
FIG. 4 is a second exemplary method of protecting privacy according to this invention.

FIG. 4 is a second exemplary method of protecting privacy according to this invention. The process begins at step S2000 and immediately continues to step S2005.

In step S2005, a query is determined. The query is determined by a customer who is presented with a description and/or summary of the information/knowledge available for query and possibly sale. The publicly available information may be determined before, after and/or simultaneously with the query without departing from the scope of this invention. After the query is determined, control continues to step S2010.

The extracted information is determined based on the query in step S2010. The extracted information includes averages, groups, cluster membership or other aggregate information concerning the subjects. Access to the underlying databases containing discrete records for the subjects is not typically available. Thus, the aggregated information and not the underlying subject records are typically available. Control then continues to step S2015.

In step S2015, information about the characteristics of the transforms applied to extract the information are determined. After the information about the characteristics of the applied transforms have been determined, control continues to step S2020.

The information about the characteristics of the data from which the information was extracted, is determined in step SS2020. The characteristics may include the sensitivity of the data such as bank account and or medical record information and the like. After the data characteristics have been determined, control continues to step S2025.

In step S2025, information about the public information concerning the subject is optionally determined. Public information is information about a subject that has already been released, is widely known and/or is easily obtained. The public information may be optionally purchased from a public information repository, or may be made available for free. After the public information concerning the subject has been optionally determined, control continues to step S2030.

A query history for the customer or group of customers is then optionally determined in step S2030. The query history contains the prior requests from the customer and/or other customers. The query history is used to ensure that the result of the current query, even if combined with prior results, does not violate any of the relevant privacy policies. After the query history has been optionally determined, control continues to step S2035.

In step S2035, the privacy policy is determined. The privacy policy may be a single privacy policy or a combined privacy policy. Moreover, the privacy policy may be privacy policies associated with subjects of a query, the entity or organization supplying the information, making the query and/or any other combination. Control then continues to step S2040 where the privacy policy is used to transform the extracted information based on the result of the current query, the characteristics of the applied transformations, the characteristics of the data, the optional query history and the optional public information concerning the subject. Control then continues to step S2045 and the process ends.

Figure 5:
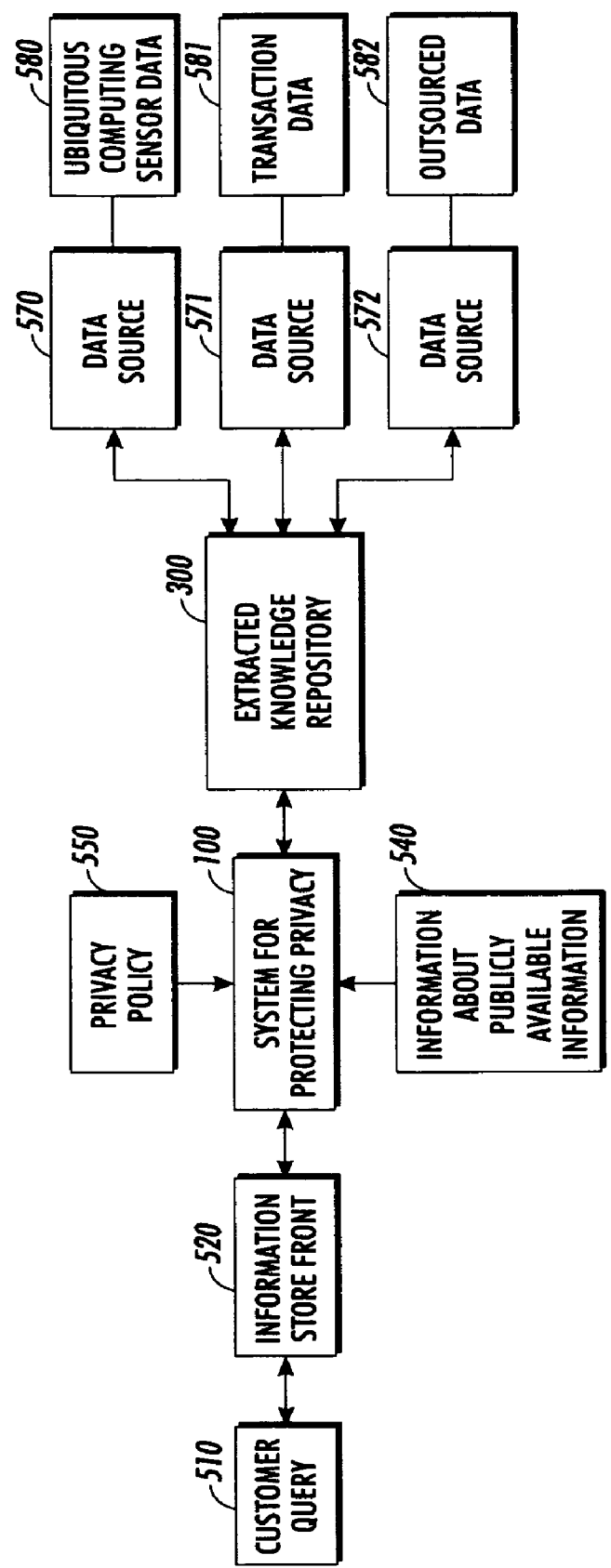
FIG. 5 is an overview of an exemplary privacy protecting system according this invention.

FIG. 5 is an overview of an exemplary privacy protecting system 100 according to this invention. A customer query 510 is submitted to a data aggregator or info-mediary via an information storefront 520. In various exemplary embodiments, the customer query 510 requests information about one or more subjects that match specific selection criteria. For example, a first employee may submit a customer query for the average salary of all employees in Organization X. If Organization X has a privacy policy prohibiting employees from learning the salaries of employees who do not report to them, then only the average salary of employees who do not report to the first employee are disclosed. In still other exemplary embodiments, the privacy policy may also prohibit non-employees from learning the salary of anyone in the organization.

The system for protecting privacy 100 allows employees outside of trusted departments to include the effect of salary and other sensitive information in their analyses. This makes it possible to analyze the organization's salary information in context. Thus, by extracting knowledge such as company-wide average salary information from corporate information repositories and interposing a system for protecting privacy 100 between any requester and the extracted knowledge, the extracted knowledge is safely released to the requestor while maintaining the relevant privacy controls.

For example, a system for protecting privacy 100 can be used to ensure that average salary information is computed across a large enough number of subjects that nothing of significance can be learned about any single subject, that no single or small group of salaries contributes unduly to the average, and that the answer to the query is not combined with the answers to previous queries or with publicly available information to reveal information about a subject.

The information storefront 520, forwards the customer's query to the system for protecting privacy 100.

The privacy protecting system 100 receives the query and determines if satisfying the customer query would violate a selected privacy policy 550 contained in the privacy policy information store. The privacy policy 550 reflects the desired privacy and/or anonymity for each subject. As discussed above, the privacy policy 550 may also reflect privacy preferences imposed by an organization such as a third party processor of the subject's information, either alone or in combination with the subject's privacy policy. The privacy policy 550 allows different types of information about a subject to have different types of protection. For example, the medical history of a subject is typically associated with a different type of protection than that associated with a subject's hair color. In various exemplary embodiments according to this invention, a privacy policy 550 may be recommended and/or required by statute, government agency, corporate policy or social norms. However, it will be apparent that any known or later developed criteria may be used to recommend/select and/or create a privacy policy 550 without departing from the scope of this invention.

Information about publicly available information 540 for a subject is used as a standard against which disclosures are measured. That is, information about the available public information for a subject or entity is determined and returned to the system for protecting privacy 100. In some cases, a privacy policy 550 may even prohibit disclosure of publicly available information. Thus, an organization may prohibit further dissemination of derogatory or sensitive publicly available information. For example, an organization may enforce a privacy policy 550 that prohibits revealing home address information even if that information is already publicly available through online telephone directories, county tax records or the like. In various other exemplary embodiments according to this invention, organizations or individuals select a privacy policy 550 that prohibits further dissemination of information perceived as damaging or derogatory. These determinations may be based on manually or automatically generated surveys of public attitude and the like.

The system for protecting privacy 100 monitors successive customer requests to determine if any of the query results can be combined to violate the determined privacy policy 550. The query results violating the privacy policy 550 are withheld or merged, generalized or otherwise transformed to comply with the determined privacy policy 550.

Information that is combinable with public information to identify a subject more specifically than permitted by the privacy policy 550 is also withheld, merged, generalized or otherwise transformed to protect the privacy.

The privacy protecting system 100 retrieves the extracted knowledge from the extracted knowledge repository 300. The extracted knowledge repository 300 contains extracted knowledge or data determined by applying the knowledge extraction transformations to one or more data sources 570-572. The data sources 570-572 may include, but are not limited to, repositories of ubiquitous sensor data 580, transactions data 581, health records, clinical trial records, survey data, outsourced data 582 or any other known or later developed source of information.

Thus, in one exemplary embodiment according to this invention, a manager of a workgroup submits a query to compare the average salary of her workgroup to the average salary of other workgroups in the organization. The average salary information is extracted from a personnel database either dynamically or in a prior step. The system for protecting privacy 100 obtains the extracted average salary knowledge or data and determines whether the extracted knowledge or data can be forwarded to the manager. The system for protecting privacy 100 determines what privacy transformations should be applied based on the extracted knowledge or data, information about the characteristics of the data used and the characteristics of the applied knowledge extraction transformations and the selected privacy policy 550.

The extracted knowledge is associated or tagged with information identifying the type of transformation or algorithm applied, the scope of the data used in the computation, the number of subjects represented in the extracted knowledge and characteristics of the knowledge extraction transformation and/or data set used. The system for protecting privacy 100 uses information about the applied knowledge extraction transformations, and characteristics about the data sets to determine if the extracted knowledge satisfies the privacy policy 550. If the privacy policy 550 is violated, the information or tags associated with the extracted knowledge are used to transform the extracted knowledge and to achieve the desired privacy policy 550.

The transformations may include but are not limited to merging, generalizing or withholding the extracted knowledge to achieve the desired privacy policy 550. In cases where the privacy policy 550 cannot be complied with by merging and/or generalizing the extracted information, the extracted knowledge may be withheld. The system for protecting privacy 100 queries the data sources in real time or on a periodic schedule in order to dynamically learn characteristics of the data sources 570-572 useful in protecting privacy.

The result of the query is then forwarded to the system for protecting privacy 100 to ensure that the identities of subject employees are not revealed and that the release of the extracted knowledge is consistent with the selected privacy policy 550. Optionally, if the extracted knowledge can be combined with public information to identify groups of individuals below a threshold set by the privacy policy, then the extracted knowledge is further transformed by merging/generalizing, withholding or otherwise transforming the extracted knowledge information.

In one of the various exemplary embodiments according to this invention, similar categories of information are combined to create larger groups of individuals in which each subject's individual information is more effectively hidden or anonymized. If categories of similar information cannot be combined, the category values are omitted to protect privacy. It will be apparent that these privacy protecting transformations are merely illustrative and that any privacy protecting transformation of the query result may be used by the system for protecting privacy 100 without departing from the spirit or scope of this invention.

The privacy protected result is then forwarded by the system for protecting privacy 100 to the information storefront 520. The information storefront 520 forwards the privacy protected result to the customer and optionally bills for the information. In various exemplary embodiments according to this invention, an information storefront 520 provides free privacy protected access to government or other data. In still other embodiments, the storefront provides free or metered privacy protected access for company or organization employees, to company or third party information.

Figure 6:
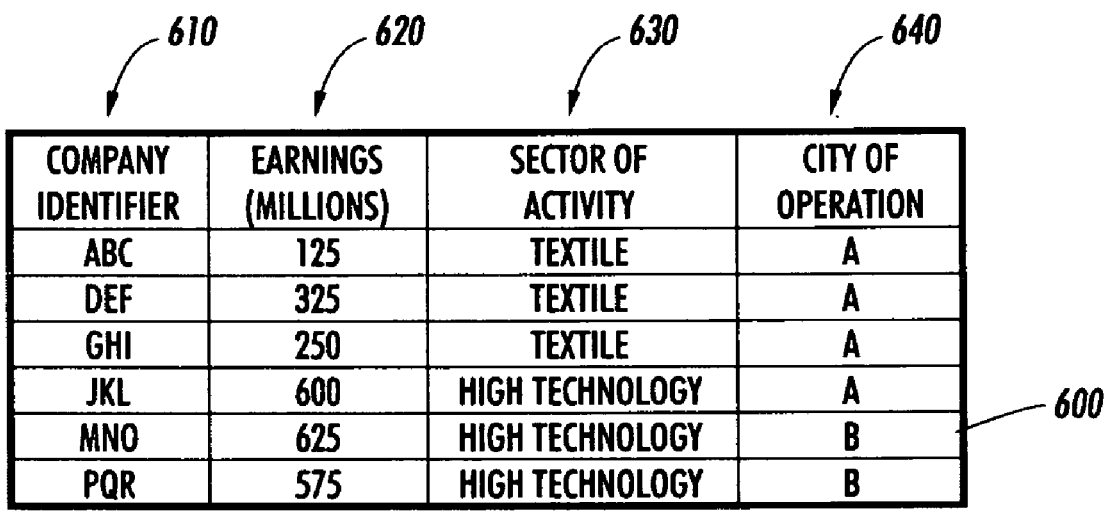
FIG. 6 is a first exemplary data structure for storing data to be mined according to this invention.

FIG. 6 is a first exemplary data structure for storing data to be mined 600 according to this invention. The first exemplary data structure for storing data to be mined 600 is comprised of a company identifier portion 610; an earnings portion 620; a sector of activity portion 630; and a city of operation portion 640.

The first row of the first exemplary data structure for storing data to be mined 600 contains the value "ABC" in the company identifier portion 610. This indicates that information in the row relates to company "ABC".

The first row contains the value "125" in the earnings portion 620. This indicates that company "ABC" is associated with earnings of "125" million dollars. The sector of activity portion 630 contains the value "TEXTILE" indicating that company "ABC" is in the textile industry. The value in the city of operation portion 640 indicates that company "ABC" has operations centered in "CITY A".

The second row contains the value "DEF" in the company identifier portion 610 and the value "325" in the earnings portion 620. This indicates that company "DEF" is associated with earnings of "325" million dollars. The sector of activity portion 630 contains the value "TEXTILE" indicating that company "DEF" is in the textile industry. The city of operation portion 640 indicates that company "DEF" has operations centered in "CITY A".

The third row contains the value "GHI" in the company identifier portion 610 and the value "250" in the earnings portion 620. This indicates that company "GHI" is associated with earnings of "250" million dollars. The sector of activity portion 630 contains the value "TEXTILE" indicating that company "GHI" is in the textile industry. The value in the city of operation portion 640 indicates that company "GHI" has operations centered in "CITY A".

The fourth row contains the value "JKL" in the company identifier portion 610 and the value "600" in the earnings portion 620. This indicates that company "JKL" is associated with earnings of "600" million dollars. The sector of activity portion 630 contains the value "HIGH TECHNOLOGY" indicating that company "JKL" is in the high technology industry. The value in the city of operation portion 640 indicates that company "JKL" has operations centered in "CITY A".

The fifth row contains the value "MNO" in the company identifier portion 610 and the value "625" in the earnings portion 620. This indicates that company "MNO" is associated with earnings of "625" million dollars. The sector of activity portion 630 contains the value "HIGH TECHNOLOGY" indicating that company "MNO" is in the high technology industry and the city of operation portion 640 indicates that company "MNO" has operations centered in "CITY B".

The sixth row contains the value "PQR" in the company identifier portion 610 and the value "575" in the earnings portion 620. This indicates that company "PQR" is associated with earnings of "575" million dollars. The sector of activity portion 630 contains the value "HIGH TECHNOLOGY" indicating that company "PQR" is in the high technology industry. The city of operation portion 640 indicates that company "PQR" has operations centered in "CITY B".

Figure 7:
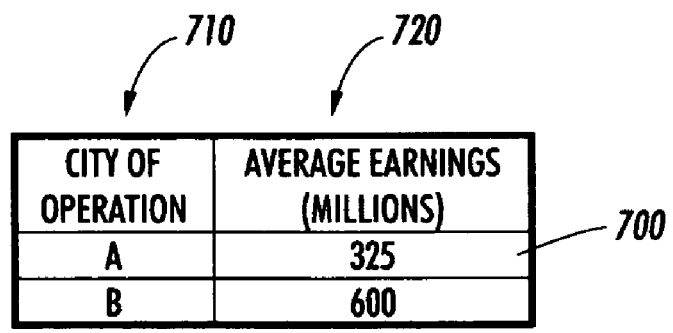
FIG. 7 is a first exemplary data structure for storing extracted knowledge according to this invention.

FIG. 7 is a first exemplary data structure for storing extracted knowledge 700 according to this invention. The first exemplary data structure for storing extracted data 700 is comprised of a city of operation portion 710 and an average earnings portion 720.

The first row contains the value "A" in the city of operation portion 710 and the value "325" in the average earnings portion 720. This indicates that the average earnings of companies having "A" as their city of operation is "325" million dollars.

The second row contains the value "B" in the city of operation portion 710 and the value "600" in the average earnings portion 720. This indicates that companies with operations located in city "B" have average earnings of "600" million dollars.

FIG. 8 is a second exemplary data structure for storing extracted knowledge 800 according to this invention. The second exemplary data structure for storing extracted knowledge or data 800 is comprised of a sector of activity portion 810 and an average earnings portion 820.

The first row contains the value "TEXTILE" in the sector of activity portion 810 and the value "233.33" in the average earnings portion 820. This indicates that companies in the "TEXTILE" sector have average earnings of "233.33" million dollars. The second row of the second exemplary data structure contains the values "HIGH TECHNOLOGY" and "600". This indicates that companies in the "HIGH TECHNOLOGY" sector have average earnings of "600" million dollars.

The first and second exemplary data structures for storing extracted knowledge or data 700-800 can be combined with public information to expose information about the earnings of company "JKL". For example, if the location of all the "HIGH TECHNOLOGY" companies is known, then information about the earnings of company "JKL" can be inferred. Thus, the customer query history is used to determine customer query results that when combined with the publicly available information violate associated privacy policies. These customer query results are then merged, withheld or transformed to enforce the determined privacy policy.

FIG. 9 is a second exemplary data structure for storing data to be mined 900 according to this invention. The second exemplary data structure for storing data to be mined 900 is comprised of a name identifier portion 910; a job category portion 920; and a salary portion 930.

The second exemplary data structure for storing data to be mined 900 is called a "Senior Management Personnel Table". The information contained in the Senior Management Personnel Table is considered extremely sensitive and access is strictly controlled.

The first row contains value "J. DOE" in the identifier portion 910, the value "VP" in the job category portion 920 and the value "18" in the salary portion 930. This indicates that the subject "J. DOE" is a vice president with a salary of 18. Similarly, the second row contains the values "A. DOE", "MANAGER" and "12" indicating that "A. DOE" is a manager with a salary of "12". The third row of the second exemplary data structure for storing data to be mined 900 contains the values "T. DOE", "MANAGER" and "13" indicating that "T. DOE" is a manager with a salary of "13".

FIG. 10 is a third exemplary data structure for storing data to be mined 1000 according to this invention. The third exemplary data structure for storing data to be mined 1000 is comprised of an identifier portion 1010; a job category portion 1020; and a salary portion 1030. The third exemplary data structure for storing data to be mined 1000 is called an "Other Personnel Table". Although the information contained in the table is sensitive, it is not considered extremely sensitive information.

The first row indicates that "P. DOE" is a "SOFTWARE RESEARCHER" with a salary of "10". The second row indicates that "K. DOE" is a "HARDWARE RESEARCHER" with a salary of "9".

Reports and other data aggregation and/or knowledge extraction transformations may be performed on this data to determine average salaries by job category and the like. In some cases, the knowledge extraction transforms may partially or completely anonymize the aggregate information. Thus, salaries of individual managers are difficult to determine from the extracted knowledge or data. However, the salary of the vice president and the software and hardware researchers can be easily deduced since they are the sole members of their respective categories.

FIG. 11 is a third exemplary data structure for storing extracted knowledge 1100 according to this invention. The third exemplary data structure for storing extracted knowledge is comprised of a job category portion 1110, an average salary portion 1120, a count portion 1130 and a SENIOR_MANAGEMENT_DERIVED portion 1140. The first two portions correspond to information fields returned by an average salary query over the second and third exemplary data structures for storing data to be mined 900-1000.

The count portion 1130 reflects the number of records in each respective grouping of categories. The SENIOR_MANAGEMENT_DERIVED portion 1140 indicates whether records in the groupings derive from the extremely sensitive Senior Management Personnel Table associated with the second exemplary data structure for storing data to be mined 900.

The first row of the exemplary data structure for storing extracted knowledge 1100 contains the values "VP", "18", "1" and "YES". This indicates that the average salary for vice presidents is "18", that only one individual is contained within the specified grouping and that the records in the grouping derive from the extremely sensitive second exemplary data structure for storing data to be mined 900.

The second row contains the values "MANAGER", "12.5", "2" and "YES". This indicates that the average salary for managers is "12.5", that two individuals are contained within the specified grouping and that the records in the grouping also derive from the extremely sensitive "SENIOR MANAGEMENT TABLE" contained within the second exemplary data structure for storing data to be mined 900.

The third row contains the values "RESEARCHER", "9.5", "2" and "NO". This indicates that the average salary for researchers is "9.5", that two individuals are contained within the specified grouping and that the records in the grouping are not derived from the extremely sensitive "SENIOR MANAGEMENT TABLE" contained within the second exemplary data structure for storing data to be mined 900.

FIG. 12 shows a first privacy policy stored within an exemplary data structure for storing a privacy policy 1300 according to this invention. The exemplary data structure for storing a privacy policy contains a privacy policy rule portion 1310. The privacy policy rule portion 1310 contains the compound privacy rule:

```
(I) IF((SENIOR_MANAGEMENT_DERIVED ='NO') &&
    (COUNT> 1)){
        DISPLAY $RECORD};
    ELSE{
        IF((SENIOR_MANAGEMENT_DERIVED ="YES") &&
        (COUNT > 3)){
            DISPLAY $RECORD};
    ELSE{
        WITHHOLD $RECORD};
    };
```

The privacy policy rule portion 1310 imposes constraints such as: 1) the minimum number of records that must be found in a grouping depending on the "SENIOR_MANAGEMENT_DERIVED" attribute; 2) the data source of the records or any known or later developed attribute or characteristic of the query or the associated data.

For example, the "SENIOR_MANAGEMENT_DERIVED" attribute or feature is associated with the value "YES". This indicates that a record or grouping is derived from the extremely sensitive "SENIOR MANAGEMENT TABLE" contained within the second exemplary data structure for storing data to be mined. The count attribute indicates the number of items in the grouping. It will be apparent that the "SENIOR_MENAGEMENT_DERIVED" and "COUNT" attributes are merely exemplary. In various other exemplary embodiments according to this invention, the sensitive information specified in the privacy rules may be determined through calculation, lookup tables or any known or later developed method without departing from the scope of this invention.

The first portion of the privacy policy rule portion 1310 contains the constraint "IF ((SENIOR_MANAGEMENT_DERIVED=='NO')&& (COUNT>1)){DISPLAY $RECORD};". This indicates that records that are not associated with the "SENIOR_MANAGEMENT_DERIVED" attribute are released or displayed if the number of items in the derived set is greater than "1".

The second portion of the privacy policy rule portion 1310 contains the constraint "IF ((SENIOR_MANAGEMENT_DERIVED=="YES")&& (COUNT>3)){DISPLAY $RECORD};". This indicates that records that are associated with the "SENIOR_MANAGEMENT_DERIVED" attribute are displayed and/or released if the number of items in the set is greater than "3".

The third portion of the privacy policy rule portion 1310 contains the constraint "ELSE{WITHHOLD $RECORD};". This indicates that unless one of the other constraints applies, the records are withheld.

FIG. 13 is a fourth exemplary data structure for storing extracted knowledge 1200 according to this invention. The exemplary data structure for storing extracted knowledge or data is comprised of a job category portion 1210 and an average salary portion 1220.

The first row of the third exemplary data structure for storing extracted knowledge 1200 contains the values "VP" and "-". This indicates that the average salary for the vice president has been suppressed or omitted since it fails to satisfy the constraints imposed by the privacy policy. That is, the average salary information for the "VP" grouping derives from the extremely sensitive "SENIOR MANAGEMENT TABLE" contained within the second exemplary data structure for storing data to be mined 900. Thus, to be released or displayed, the count of individual in the grouping must be more than 3. However, since there is only one subject in the set, the information is withheld from the query result.

The second row of the third exemplary data structure for storing extracted knowledge 1200 contains the values "MANAGER" and "-". This indicates that the average salary for managers has also been suppressed or omitted for failing to satisfy the constraints imposed by the privacy policy. That is, the average salary information for the "MANAGER" grouping derives from the extremely sensitive "SENIOR MANAGEMENT TABLE" contained within the second exemplary data structure for storing data to be mined 900. Thus, to be released or displayed, the count of subjects in the grouping must be more than 3. Since there are only two individuals in the set, the information is withheld from the query result.

The third row of the third exemplary data structure for storing extracted knowledge or data 1200 contains the values "RESEARCHER" and "9.5". This indicates the average salary for researchers is displayed since it satisfies the constraints imposed by the privacy policy. That is, the average salary information for the "RESEARCHER" grouping derives from the less sensitive "OTHER MANAGEMENT TABLE" contained within the third exemplary data structure for storing data to be mined 1000. Thus, to be released or displayed, the count of individual in the grouping must be more than 1. Since there are two subjects in the set, the information is displayed in the query result.

In various other exemplary embodiments according to this invention, the "VP" and/or "MANAGER" salary information may be merged into related job categories that satisfy the required privacy policy. Thus, the "VP" category may be merged into the "MANAGERS" category in an attempt to satisfy the required privacy policy or may be withheld.

In various exemplary embodiments according to this invention, the system for protecting privacy 100 allows meaningful reports to be generated by non-privileged staff while ensuring that the procedures for access to confidential information are maintained in compliance with organizational privacy policies and/or procedures.

FIG. 14 is a fifth exemplary data structure for storing extracted knowledge 1400 according to this invention. In one of the various embodiments, the fifth exemplary data structure for storing extracted knowledge 1400 contains grocery data. The exemplary data structure for storing extracted knowledge 1400 contains an identifier portion 1410; a coupon usage portion 1420; a generic usage portion 1430 and a frequency portion 1440. However, these features are merely exemplary. Any known or later developed features associated with and/or inferred from one or more transactions may also be used in the practice of this invention.

The identifier portion 1410 contains a first initial and a last name. However, it will be apparent that in various other exemplary embodiments according to this invention, the values stored in the identifier portion 1410 may include but are not limited to social security numbers, account numbers, telephone numbers or any known or later developed identifier useful in associating features with a subject.

The coupon usage portion 1420 contains binary values indicating whether the subject uses coupons. However, it should be apparent that numeric values or any known or later developed means of indicating coupon usage can also be used without departing from the scope of this invention.

The generic usage portion 1430 contains numeric values between 0 and 1 indicating a likelihood that the identified subject uses generically labeled grocery products. In still other exemplary embodiments, the likelihood values are encoded using binary values and/or any other known or later developed method of indicating a likelihood measure.

The frequency portion 1440 contains a value indicative of how frequently the subject has visited the grocery store. The values are used to classify a subject as a "rare" or a "frequent" shopper based on various criteria. As discussed above, numeric values, groups or bins, codes or any other means of classifying the subjects may also be used without departing from the scope of this invention.

The first row of the fifth exemplary data structure for storing extracted knowledge 1400 contains the value "J. DOE" in the identifier portion 1410; "YES" in the coupon usage portion 1420; "0.1" in the generic usage portion 1430; and "RARE" in the frequency portion 1440. These values indicate that subject J. DOE is associated with coupon usage, is unlikely to select a generic product and shops only rarely.

The second row contains the values "T. DOE"; "YES"; "0.1" and "RARE". These values indicate that subject "T. DOE" is associated with coupon usage, is unlikely to select a generic product and shops only rarely.

The $N^{th}$ row contains the values "A. DOE"; "NO"; "0.8" and "FREQUENT". These values indicate that subject "A. DOE" is not associated with coupon usage, is likely to select a generic product and shops frequently.

FIG. 15 shows a second privacy policy stored within an exemplary data structure for storing a privacy policy 1300 according to this invention. The privacy policy rule portion 1320 contains a privacy policy that displays the non-identifying parts of the records only if at least two records share similar non-identifying attributes. The first two records in the fifth exemplary data structure for storing extracted knowledge 1400 contain the same values in the coupon usage portion 1420, the same values in the shopping frequency portion 1440 and the same values in the generic usage portion 1430. Therefore the first two records are aggregated. The aggregated result is then displayed and/or made available to the customer. However, the values contained in the $N^{th}$ row are withheld since the values in the $N^{th}$ row are not associated with at least one, other row having the same or similar values.

FIG. 16 shows a fourth exemplary data structure for storing data to be mined 1500 according to this invention. The fourth exemplary data structure for storing data to be mined 1500 contains pharmacy information. The fourth exemplary data structure containing data to be mined 1500 is comprised of an identifier portion 1510; and amount portion 1520; a date portion 1530 and a product portion 1540.

The identifier portion 1510 contains a first initial and a last name. However, it will be apparent that in various other exemplary embodiments according to this invention, the values stored in the identifier portion 1510 may include but are not limited to social security numbers, account numbers, telephone numbers or any known or later developed identifier useful in associating informational features with a subject.

The amount portion 1520 contains the amount of each recorded transaction. The date portion 1530 contains the date associated with each transaction.

The product portion 1540 indicates the product purchased by the subject. The value in the product portion may be a product identifier, a UPC code, a string describing the product and/or any known or later developed means of identifying the purchased product.

The first row contains the value "T. DOE" in the identifier portion 1510. This indicates that the stored transaction information relates to the subject "T. DOE".

The amount portion 1520 contains the value "$50.00" indicating the amount paid by the subject in the transaction. The date portion 1530 contains the value "1/1/2004" indicating the date of the transaction in the standard U.S. month, day year format. The product portion 1540 contains the value "DRUG A" indicating the specific product purchased. The second and third rows also reflect purchases of "DRUG A" by subject "T. DOE" in March and June of 2004. This information could be combined to infer a long term need for medication due to a chronic illness or the like.

The $N^{th}$ row contains the values "A. DOE"; "12.00"; "2/10/2004"; and "DRUG B". These values indicate that subject "A. DOE" purchased "$12.00" of "DRUG B" on Feb. 10, 2004.

FIG. 17 shows a third exemplary privacy policy stored within an exemplary data structure for storing a privacy policy 1300 according to this invention. The privacy policy rule portion 1330 contains a privacy policy rule covering three cases. The first case deals with customer usage that is classified as a "HEALTH_CARE_MANAGEMENT" type of usage. Thus, access to the otherwise private information is automatically provided to the subject's attending physicians, assigned nurses and the like when the customer usage is identified as "HEALTH_CARE_MANAGEMENT".

The second case deals with customer usage that is classified as marketing type of usage. In this case, additional constraints must be satisfied before the information is released. That is, the date and product values associated with the records are removed and the transaction amount values are rounded to the nearest twenty dollars. Finally, the third case or default case specifies that the subject's information should be withheld for any type of customer usage not expressly authorized by the first two cases.

FIG. 18 is a fifth exemplary data structure for storing data to be mined 1600 according to this invention. The third exemplary data structure is comprised of an identifier portion 1610; a date portion 1620; a location portion 1630; and an amount portion 1640.

The identifier portion 1610 contains a first initial and a last name. However, it will be apparent that in various other exemplary embodiments according to this invention, the values stored in the identifier portion 1610 may include but are not limited to social security numbers, account numbers, telephone numbers or any known or later developed identifier useful in associating informational features with a subject.

The values in the date portion 1620 reflect the date of each transaction. The location portion 1630 contains a location value specifying where the transaction occurred. The location information may be encoded as an address, longitude and latitude coordinates, map coordinates, and/or using any known or later developed method of specifying location information.

The amount portion 1640 contains values indicating the amount of each transaction. The values in the amount portion 1640 are encoded in units of specific currencies. Values that are not in a customer's desired currency are converted to the customer's desired currency based on historical currency conversion information and the date of the transaction.

The first row of the third exemplary data structure for storing transaction information 1600 contains the values "T. DOE"; "1/1/2004"; "SAN FRANCISCO"; and "USD $14.00". This indicates that subject "T. DOE" purchased 14.00 US dollars worth of gasoline on Jan. 1, 2004 in San Francisco, Calif. USA. Similarly, the second row values of "T. DOE"; "1/7/2004"; "SAN FRANCISCO Calif. USA" and "USD $12.00" indicate a second purchase of 12.00 US dollars worth of gasoline on Jan. 7, 2004 in San Francisco, Calif. USA.

The third row contains the values "T. DOE"; "1/14/2004"; "VANCOUVER BC CANADA"; and "USD 16.00". This indicates that subject "T. DOE" purchased 16.00 US dollars worth of gasoline in Vancouver BC Canada on Jan. 14, 2004. As discussed above, the value in the amount portion 1640 is automatically converted from the Canadian transaction amount to the customer's desired currency value of US dollars.

The fourth row contains the values "T. DOE"; "2/3/2004"; "LAKE TAHOE Calif. USA"; and "USD 20.00". This indicates the purchase of 20.00 US dollars worth of gasoline in Lake Tahoe on Feb. 3, 2004 by subject T. DOE. Finally, the $N^{th}$ row contains the values "A. DOE"; "1/28/2004"; RESTON VA USA"; and "USD 11.00". These values indicate the purchase of 11.00 US dollars worth of gasoline on Jan. 28, 2004 in Reston Va. by subject A. DOE.

FIG. 19 shows a fourth privacy policy stored within an exemplary data structure for storing a privacy policy 1300 according to this invention. The privacy policy is comprised of a privacy policy rule portion 1340. If the fields required by the customer include the "IDENTIFIER" field, then the information is clustered based on location and only the location clusters are revealed to the customer. However, if the customer does not require the identifier field, the identifier field is removed and the remaining information including the values in the date portion 1620; the location portion 1630 and the amount portion 1640 are returned to the customer. It should be apparent these values are merely examples. Moreover the systems and methods of this invention provide for associating various types of subject information with various types of privacy policies.

In the various embodiments of the system for protecting privacy 100, each of the circuits 10-80 outlined above can be implemented as portions of a suitably programmed general-purpose computer. Alternatively, 10-80 of the system for protecting privacy 100 outlined above can be implemented as physically distinct hardware circuits within an ASIC, or using a FPGA, a PDL, a PLA or a PAL, or using discrete logic elements or discrete circuit elements. The particular form each of the circuits 10-80 of the system for protecting privacy 100 outlined above will take is a design choice and will be obvious and predictable to those skilled in the art.

Moreover, the system for protecting privacy 100 and/or each of the various circuits discussed above can each be implemented as software routines, managers or objects executing on a programmed general purpose computer, a special purpose computer, a microprocessor or the like. In this case, the system for protecting privacy 100 and/or each of the various circuits discussed above can each be implemented as one or more routines embedded in the communications network, as a resource residing on a server, or the like. The system for protecting privacy 100 and the various circuits discussed above can also be implemented by physically incorporating the system for protecting privacy 100 into a software and/or hardware system, such as the hardware and software systems of a web server or a client device.

As shown in FIG. 3, memory 20 can be implemented using any appropriate combination of alterable, volatile or non-volatile memory or non-alterable, or fixed memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 99 shown in FIGS. 1 and 3 can each be any known or later developed device or system for connecting a communication device to the system for protecting privacy 100, including a direct cable connection, a connection over a wide area network or a local area network, a connection over an intranet, a connection over the Internet, or a connection over any other distributed processing network or system. In general, the communication links 99 can be any known or later developed connection system or structure usable to connect devices and facilitate communication.

Further, it should be appreciated that the communication links 99 can be a wired or wireless links to a network. The network can be a local area network, a wide area network, an intranet, the Internet, or any other distributed processing and storage network.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A computer-implemented method of protecting privacy, wherein the computer includes a processor, comprising the steps of:

receiving a request for aggregated information that is based on an extraction transformation applied to stored information, wherein the extraction transformation is based on data mining;

determining extraction characteristics based on characteristics of the extraction transformation, or the stored information, or both;

applying, by the computer, a privacy protecting transformation to the aggregated information based on a privacy policy and the extraction characteristics, wherein the privacy protecting transformation decouples the aggregated information, which combines information associated with a plurality of individual subjects, from a respective individual subject covered by the privacy policy; and returning a response to the request based on the applied privacy protecting transformation.

2. The method of claim 1, wherein applying the privacy protecting transformation is based on the request for the aggregated information.

3. The method of claim 1, further comprising:

determining one of the individual subjects associated with the aggregated information; and determining public information associated with the individual subject, wherein the privacy protecting transformation is based on the public information concerning the individual subject.

4. The method of claim 1, further comprising determining a history of requests for the aggregated information, wherein applying the privacy protecting transformation is based on the history of requests.

5. The method of claim 4, wherein the history of requests for the aggregated information is determined based on at least one of: an identifier, a name, an account identifier, a protocol address identifier, a legal relationship, a location, and time.

6. The method of claim 1, wherein the privacy policy is a combined privacy policy based on at least two privacy policies.

7. The method of claim 6, wherein the combined privacy policy is based on at least one of: a privacy policy associated with a subject of the request for the aggregated information, and a privacy policy associated with the originator of the request for the aggregated information.

8. The method of claim 1, wherein the request for the aggregated information originates from at least one of an organization and an individual.

9. The method of claim 8, wherein the organization is at least one of: a buyer; a seller; an employer; and a government entity.

10. The method of claim 1, wherein the request for the aggregated information refers to at least one of: an individual; an organization; and a transaction.

11. The method of claim 1, wherein the stored information is at least one of: transaction information; personal information; financial information; and location information.

12. The method of claim 11, wherein the transaction information is at least one of: credit card; purchase; sale; refund; merchandise return; coupon; and discount information.

13. The method of claim 11, wherein the personal information is at least one of: demographic; health; financial; employment; location and ownership information.

14. The method of claim 11, wherein the financial information is at least one of: home ownership; stock ownership; bond ownership; business ownership; mortgage; bank account; credit score; net worth; and salary.

15. The method of claim 11, wherein the location information is at least one of: inferred location information and specific location information.

16. The method of claim 15, wherein the inferred location information is based on at least one of: communication information and machine type information.

17. The method of claim 15, wherein the specific location information is based on at least one of: global positioning; cellular antenna; video; sound; and biometric information.

18. The method of claim 1, wherein the privacy protecting transformation includes at least one of: merging information and aggregating information.

19. The method of claim 1, wherein the privacy protecting transformation performs at least one of: merging, withholding, and generalizing information based on the privacy policy.

20. The method of claim 1, wherein applying the privacy protecting transformation is based on prior requests for information.

21. The method of claim 20, wherein the prior requests for information are from at least one of: an individual requestor and a group of requestors.

22. The method of claim 1, wherein the privacy protecting transformation is based in part on a generalization introduced by knowledge extraction.

23. A system for protecting privacy comprising:
an input/output circuit that receives a request for aggregated information that is based on an extraction transformation applied to stored information, wherein the extraction transformation is based on data mining;
a memory; and
a processor that
determines extraction characteristics based on characteristics of the extraction transformation, or the stored information, or both;
applies a privacy protecting transformation to the aggregated information based on a privacy policy and the extraction characteristics, wherein the privacy protecting transformation decouples the aggregated information, which combines information associated with a plurality of individual subjects, from a respective individual subject covered by the privacy policy; and
returns a response to the request based on the applied privacy protecting transformation.

24. The system of claim 23, wherein applying the privacy protection transformation is based on the request for the aggregated information.

25. The system of claim 23, wherein the processor further
determines one of the individual subjects associated with the aggregated information;
determines public information associated with the individual subject; and
applies the privacy protecting transformation based on the public information concerning the individual subject.

26. The system of claim 23, further comprising determining a history of requests for information; wherein applying the privacy protecting transformation is based on the history of requests.

27. The system of claim 26, wherein a history of requests for the aggregated information is determined based on at least one of: an identifier, a name, an account identifier, a protocol address identifier, a legal relationship, a location, and time.

28. The system of claim 23, wherein the privacy policy is a combined privacy policy based on at least two privacy policies.

29. The system of claim 28, wherein the combined privacy policy is based on at least one of: a privacy policy associated with a subject of the request for the aggregated information, and a privacy policy associated with an originator of the request for the aggregated information.

30. The system of claim 23, wherein the request for the aggregated information received by the input/output circuit originates from at least one of: an organization and an individual.

31. The system of claim 30, wherein the organization is at least one of: a buyer; a seller; an employer; and a government entity.

32. The system of claim 23, wherein the request for the aggregated information refers to at least one of: an individual; an organization; and a transaction.

33. The system of claims 23, wherein the stored information is at least one of: transaction information; personal information; financial information; and location information.

34. The system of claim 33, wherein the transaction information is at least one of: credit card; purchase; sale; refund; merchandise return; coupon; and discount information.

35. The system of claim 33, wherein the personal information is at least one of: demographic; health; financial; employment; location and ownership information.

36. The system of claim 33, wherein the financial information is at least one of: home ownership; stock ownership; bond ownership; business ownership; mortgage; bank account; credit score; net worth; and salary.

37. The system of claim 33, wherein the location information is at least one of: inferred location information and specific location information.

38. The system of claim 37, wherein the inferred location information is based on at least one of: communication information; and machine type information.

39. The system of claim 37, wherein the specific location information is based on at least one of: global positioning; cellular antenna; video; sound; and biometric information.

40. The system of claim 23, wherein the privacy protecting transformation includes at least one of: merging information and aggregating information.

41. The system of claim 23, wherein the privacy protecting transformation performs at least one of: merging, withholding, and generalizing information based on the privacy policy.

42. The system of claim 23, wherein applying the privacy protecting transformation is based on prior requests for information.

43. The system of claim 42, wherein the prior requests for information are from at least one of: an individual requestor and a group of requestors.

44. The system of claim 23, wherein applying the privacy protecting transformation is based in part on a generalization introduced by knowledge extraction.

45. A non-transitory computer-readable storage device comprising: computer readable program code embodied on the computer readable storage medium, the computer readable program code usable to program a computer for protecting privacy comprising:
receiving a request for aggregated information that is based on an extraction transformation applied to stored information, wherein the extraction transformation is based on data mining;
determining extraction characteristics based on characteristics of the extraction transformation, or the stored information, or both; and
applying a privacy protecting transformation to the aggregated information based on a privacy policy and the extraction characteristics, wherein the privacy protecting transformation decouples the aggregated information, which combines information associated with a plurality of the individual subjects, from a respective individual subject covered by the privacy policy; and returning a response to the request based on the applied privacy protecting transformation.

46. A method of protecting privacy comprising:

determining a privacy policy;

determining an extraction transformation, which is based on data mining;

aggregating the stored information by applying the extraction transformation to the stored information; and applying a privacy protecting transformation to the aggregated information based on the determined privacy policy, wherein the privacy protecting transformation decouples the aggregated information, which combines information associated with a plurality of the individual subjects, from a respective individual subject covered by the privacy policy.

47. A system for protecting privacy comprising:

an input/output circuit that receives a request for aggregated information that is based on an extraction transformation applied to stored information, wherein the extraction transformation is based on data mining;

a memory; and a processor that determines a privacy policy; and determines an extraction transformation, which is based on data mining and comprises characteristics of the extraction transformation, or the stored information, or both;

applies a privacy protecting transformation to the aggregated information based on the privacy policy and the extraction transformation, wherein the privacy protecting transformation decouples the aggregated information, which combines information associated with a plurality of the individual subjects, from a respective individual subject covered by the privacy policy.

* * * * *